United States Patent Office 3,252,850
Patented May 24, 1966

3,252,850
FIRE RESISTANT MODIFIED EPOXY NOVOLAC RESINS AND LAMINAE BONDED WITH SAME
Alexander M. Partansky, Concord, Calif., assignor to The Dow Chemical Company, Midland, Mich., a corporation of Delaware
No Drawing. Filed Nov. 2, 1961, Ser. No. 149,493
14 Claims. (Cl. 161—185)

The invention concerns a new improved epoxy resin having heat-resistant, fire-retardant and self-extinguishing properties.

The term, heat-resistant, refers herein to the property of resisting softening when subjected to elevated temperatures. The term, fire-retardant, refers herein to the retardation or resistance to burning, and the term self-extinguishing refers to a property of discontinuing burning when not in direct contact with a flame or other igniting source under the conditions specified in Flammability Tests for Self-Extinguishing Plastics, e.g., A.S.T.M. Test No. D 635–56T or its adoption to glass cloth laminates by the Boeing Aeroplane Company, known as BMS 8–5C Test, explained more fully hereinafter. The term, epoxy resin, as used herein, means an organic material containing free reactive oxirane groups and more specifically means a resin prepared by reacting an epihalohydrin or dihalohydrin and a polyhydric phenolic compound in the presence of a suitable catalyst or agent to produce an ether having an average of more than one oxirane group per molecule. Illustrative of polyhydric phenolic compounds employed are novolac resins. The latter are phenol-aldehyde thermoplastic resins made by the condensation reaction of a molar excess of phenol to aldehyde, usually formaldehyde. The epoxy resins so made are known as epoxy novolac resins and are employed in the composition of the invention.

The existence of a need for an epoxy resin having high resistance to softening at elevated temperatures and to burning has prompted attempts to make such epoxy resin without impairment of any of the well known desirable properties associated with epoxy resins. Such previous attempts have not been fully successful.

The invention provides a self-extinguishing epoxy resin composition which meets these needs. It is made by reacting an epoxy novolac resin and a halogenated monohydric phenol, said phenol being employed in a controlled amount such that sufficient oxirane groups remain for a subsequent cross-linking after admixture therewith of a curing agent, e.g., a Lewis acid, an acid anhydride or an amine. A minor amount of a bifunctional phenol may also be employed as an additional ingredient, if desired, to raise the molecular weight and melting point of the uncured resin. Addition of auxiliary fire-retardant agents is sometimes beneficial and they may be also employed; antimony trioxide, phosphates and borates may be used for this purpose.

In one embodiment of the invention a non-halogenated epoxy resin is admixed with the epoxy novolac-halogenated monophenol adduct to lessen the amount of halogen present in the final mix to an amount not substantially greater than the minimum percent required to impart self-extinguishing characteristics. Any known epoxy compound or resin with functionality of two or greater may be so used, however addition of epoxy novolacs with a functionality of three or greater is particularly advantageous.

In the process of the manufacture of the self-extinguishing epoxy resin of the invention by condensation of an epoxy novolac and a polyhalogenated monophenol, there are no by-products formed and no excess of either of the reactants or of solvents remaining that need to be separated from the product. Accordingly, as soon as the condensation has been completed the resin product may be dumped into cooling pans and is ready for shipment to a user. Therefore, in addition to other advantages, the self-extinguishing resin of the invention affords simplicity of manufacturing procedure over those required in the manufacture of known types of self-extinguishing epoxy resins.

Epoxy novolac resins, in general, possess properties which make them preferred for certain uses over other epoxy resins as broadly defined above. The resins of the invention retain all the desired properties of epoxy novolac resins, among which are a higher softening point obtainable by virtue of greater cross-linking during cure thereby resulting in a more closely knit thermosetting resin giving better retention of physical properties at higher temperatures. Such properties make the epoxy novolac resins particularly desirable for castings, for the preparation of structural laminates and chemically resistant surface coatings. The resins of the invention, in addition to such properties associated with epoxy novolac resins possess such marked lessening of flammability as to be self-extinguishing.

In preparing the resin of the invention, sufficient halogen must be provided to insure self-extinguishment. In the absence of any auxiliary fire-retardant agents there should be at least about 10 percent bromine or at least about 18 percent chlorine by weight of the cured resin composition. Combinations of bromine- and chlorine-substituted resin giving equivalent weight percents intermediate between 10 and 18 percent, dependent on the ration of bromine to chlorine, are equally satisfactory. When one of the auxiliary fire-retardant agents aforementioned is present, in an amount between about 2 and about 5 percent, there results a synergistic fire-retardant effect and as little as about 6–7 percent bromine and as little as about 10 percent chlorine in the resin is necessary to give self-extinguishing properties. When reacting the halogenated phenol and epoxy novolac resin, sufficient oxirane functionality must be preserved for subsequent hardening by means of a cross-linking agent. Such hardening or cross-linking agents include Lewis acid, e.g. boron trifluoride complexes of which $BF_3$:monoethylamine is illustrative; primary and secondary, aliphatic and aromatic amines; dicyandiamide; and methyl cyclopentadiene-maleic acid adduct. Accordingly, it is recommended that the functionality not be reduced much below an average of two oxirane groups per molecule by the reaction. It is further recommended that the halogenated phenol-modified epoxy novolac resin so made have a Durran's softening point of between about 65° and 80° C., about 70° C. being particularly suitable to provide satisfactory handling characteristics and a molecular weight best suited for the use in casting, in laminating, and in surface coating.

The novolac resins (sometimes called merely novolacs) employed hereinafter were prepared by reacting a molar excess of phenol with formaldehyde in the presence of an acid catalyst and may be considered to have the formula:

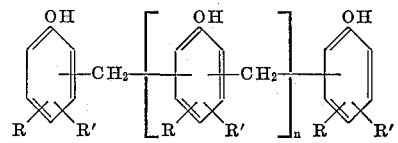

wherein $n$ may vary from about zero to an average value of about 4. It is necessary that $n$ have a value sufficiently above zero to provide enough oxirane groups, when epoxidized, to react with the halogenated monophenol and yet to retain an average of about two unreacted oxirane groups per molecule for cross-linking with the curing agent subsequently admixed therewith, as stated hereinabove. In the practice of the invention, n usually has an avergae value of from 0.5 to 3.5, making an average total number of phenol groups per molecule of from 2.5 to 5.5. The preferred average number of phenol groups per molecule is between 3.0 and 3.5. R and R' represent independently selected substituents on the phenolic nuclei selected from the group consisting of hydrogen chloride, bromine, and alkyl, aryl, aralkyl, and alkaryl hydrocarbons wherein each alkyl group when present contains from 1 to 10 carbon atoms. The presence of chlorine or bromine thereon is advantageous but as explained hereinafter is not essential, since most of the required halogen content is provided by the halogenated monophenol. To provide such substituted epoxy novolac, a substituted phenol is employed with the formaldehyde in the making thereof. Novolac resins are thermoplastic and, accordingly, may be remelted and employed in further reactions.

A novolac of the type above described may be epoxidized by known procedures, typically by reacting it with epichlorohydrin in the presence of an alkali metal hydroxide. The amounts of each reactant employed are such as to provide from 3–5 times the molar excess of oxirane groups, i.e.,

and only about a 5 percent molar excess of the alkali metal hydroxide; both values are based on the phenolic hydroxyl groups present in the novolac. Either NaOH or KOH gives equally good results; however, for economical reasons NaOH is generally used. The temperature employed may be from 40° to 150° C., but is usually between about 70° and about 110° C. Usually the novolac resin is dissolved in epichlorohydrin in a suitable reaction vessel and a 25–50 percent aqueous solution of KOH or NaOH gradually added thereto, usually over a period from 0.1 to 4 hours while accompanied by mild agitation. The reaction is exothermic and a cooling means, usually a reflux, is employed to maintain the desired temperature. A partial vacuum may be used when the temperature selected is below the boiling point of epichlorohydrin. An epoxy novolac is thus produced which is subsequently separated from the by-product salt formed in the reaction and from the excess of epichlorohydrin by conventional procedures, e.g., separating the salt by filtration and removing the epichlorohydrin by vacuum distillation. Water washing of the resin may also be employed.

The epoxidized novolac for use in the practice of the invention is assumed to have the formula:

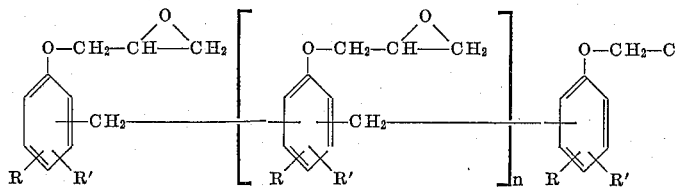

wherein n has the same value denoted in the novolac formula, supra, and R and R' are substituents on the phenolic nuclei independently selected from the class consisting of hydrogen, chlorine, bromine, alkyl, aryl, alkaryl, or aralkyl, the alkyl groups each containing from 1 to 10 carbon atoms.

The epoxidized novolac, which may also be considered a polyglycidyl ether of the aldehyde-phenol condensate, is then reacted with a monohydroxy polyhalophenol. In one embodiment of the invention, a small amount of difunctional phenol, e.g. resorcinol, hydroquinone, or a bisphenol, e.g. bisphenol A, i.e. 4,4'-isopropylidenediphenol, as described in Epoxy Resins, by Lee and Neville, pages 8 and 9 and 10 to 12, published by McGraw-Hill Book Company, New York (1957), including substituted bisphenols, e.g., halogenated bisphenols, may be added to the reaction mixture for the purpose of increasing the melting point and molecular weight of the resinous product. The difunctional, i.e. dihydroxy phenol, when employed, is usually employed in an amount sufficient to provide between 0.05 and 0.35 mole per mole of the epoxy novolac present. The diphenol is preferably added to the mixture after at least a portion of the monofunctional halophenol has reacted.

The di-, tri-, tetra-, or pentabromophenol or the tri-, tetra-, or pentachlorophenol may be employed as the halophenol in the practice of the invention. The dichlorophenol is not employed because it does not provide sufficient halogen to impart self-extinguishing properties to the resulting resin adduct.

The chlorophenol or bromophenol employed may be prepared by known methods which consist essentially of passing the halogen into a confined body of the phenol in a suitable reaction vessel provided with stirring and cooling means. The reaction temperature is maintained between about 10° and 30° C., a temperature of between 15° and 20° C. usually being maintained. The action being exothermic, the rate of addition of the halogens is controlled to prevent development of undesirably high temperatures. The extent of halogenation is largely dependent upon the proportion of halogen to phenol, the reaction temperature, the length of the halogenating period and the presence or absence of catalysts. The halogenated phenol may be considered to have the following formula:

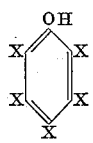

wherein X may be bromine, chlorine, or hydrogen, provided that at least 2 of the X substituents must be bromine or at least 3 of the X substituents must be chlorine or at least 1 X be bromine and 2 X be chlorine.

The reaction between the halogenated phenol and the epoxy novolac takes place between hydroxyl groups of the phenol and a portion of the oxirane groups of the epoxy novolac. Some oxirane groups must remain for subsequent cross-linking to form the desired thermoset resin.

The reaction between the halogenated phenol and the epoxy novolac is usually carried out by putting the epoxy novolac and the halogenated monohydric phenol in a reaction vessel provided with means for stirring and heating and for controlling and recording the temperature. To help initiate the reaction at a lower temperature, and in general to control the reaction, small amounts, e.g. between 10–1000 parts of a tertiary amine catalyst per million parts of the reaction mixture by weight are admixed therewith. Among such catalysts are benzyldimethyl amine and triethyl amine. The mixture is then maintained at a controlled temperature of reaction until it is substantially completed, i.e., until the hydroxyl groups of the monohydric phenol have reacted with the oxirane groups of the epoxy resin. The reaction is exothermic and, accordingly, the temperature rises as the hydroxyl groups of the phenol enter into the reaction with increasing vigor but drops off as they become depleted. The temperature is controlled by providing heat to initiate and to promote the reaction in its early stage, cooling the reaction mixture as the reaction reaches its greatest intensity, and, as the exothermic heat subsides, again applying heat for an additional period to insure substantially complete reaction of the phenolic hydroxyls. When a polyhydric phenol is employed, as an added ingredient in the preparation of the composition of the invention, it is convenient to add it at about the time that the exothermic temperature rise begins to subside. The supplementary fire-retardant or anti-burning ingredient, e.g., $Sb_2O_3$, is usually added at the time of compounding the resin for use, i.e., when adding a curing catalyst preparatory to making castings or a laminating solution.

The general procedure immediately below is one mode of carrying out the reaction and was followed in the examples of the invention hereinafter set forth.

An epoxy novolac resin, of the type represented by the above formula, is placed in a reaction vessel, equipped as above described. Heat is applied until the resin has reached a temperature of about 100°. At this temperature the resin becomes quite fluid. Stirring is provided, to maintain uniform temperature and consistency, and the halogenated monohydric phenol is then admixed slowly therewith. The optimum rate of adding the phenol is that which just permits continuous dissolution thereof in the epoxy novolac. By this time the temperature of the reaction mixture usually has risen to between about 110° and 120° C. as a result of the heat provided by the exterior heating means. At this time the catalyst, usually a tertiary amine and preferably dissolved in a small amount of a volatile and inert organic solvent, e.g., xylene, in an amount of between about 0.01 and about 0.5 percent by weight of the mixture, is added to the mixture. The temperature usually continues to rise, although cooling is provided, to between about 140° and 160° C. and then drops off. When it has dropped to about 140° C., cooling is discontinued and heat is applied to maintain the temperature at about 140° C. for an additional 20–30 minutes. Heating is then discontinued and the mixture cooled. The average temperature for the entire reaction is usually between about 130° and 150° C. over a total time of between 0.75 and 1.5 hours. When a polyphenol is employed in the composition, it is usually added between 5 and 10 minutes after the exothermic temperature peak of the reaction has been reached.

The resins of the examples so made were evaluated and the following properties ascertained:

(1) Molecular weight by the cryoscopic method, using dioxane as the solvent;
(2) Epoxide equivalent weight by the pyridinium hydrochloride method;
(3) Resin functionality by dividing the molecular weight by the epoxide equivalent weight;
(4) Melting point according to the Durran's mercury method;
(5) Viscosity and color by dissolving the resins in butyl Carbitol to make a 40 percent solution and obtaining the viscosity and color values of the solution by comparing with Gardner oil standards.

The results of the evaluation of the uncured resin thus obtained are set out in Table I, infra.

The resins of the examples were also evaluated by admixing therewith a curing agent and casting the curable mixtures into ½ x ½ x 6 inch bars, curing and determining the heat distortion value according to A.S.T.M. D 648–56, hardness according to the Barcol hardness test, and heat stability at 200° C. by placing ½" cubes of the cured resin into tared porcelain crucibles, obtaining the weight of the cubes, placing the crucibles in a circulating hot air oven for measured periods of time, and periodically reweighing them to determine the change in weight. The results thus obtained on the castings are set out in Table II, infra.

*Table I*

| Ex. No. | Phenol Reacted in— | Molar Ratios of 3.3 EN [1] Phenols | Weight percent of TEA [2] | Reaction Conditions | | Average Oxirane Groups per Molecule [3] | Weight percent Halogen in Resin | S.P.,[4] ° C. | Gardner [5] | |
|---|---|---|---|---|---|---|---|---|---|---|
| | | | | Time in min. | Temp. in ° C. | | | | Vis. | Color |
| 1 | 2,4,5-Cl₃PhOH | 1/1.5 | 0.01 | 90 | 140–160 | 1.51 | 18.4 Cl | 60 | 65 | 4 |
| 2 | 2,4,6-Cl₃PhOH | 1/1.5 | 0.01 | 90 | 140–150 | 1.45 | 18.4 Cl | 50 | 51 | 6 |
| 3 | 2,4,5,6-Cl₄PhOH | 1/1.2 | 0.07 | 90 | 160 | 2.10 | 20.2 Cl | 61 | 60 | 10 |
| 4 | 2,4,5,6-Cl₄PhOH, 2,4,6-Br₃PhOH. | [6] 1/0.7/0.3 | 0.02 | 30 | 160 | 2.22 | 12.0 Cl, 8.7 Br | 60 | 51 | 6 |
| 5 | Cl₅PhOH | 1/1.2 | 0.01 | 70 | 140–157 | 2.12 | 24.3 Cl | 68 | 60 | 13 |
| 6 | Cl₅PhOH, Br₃PhOH | [6] 1/0.8/0.2 | 0.02 | 30 | 150–165 | 2.37 | 16.4 Cl, 9.1 Br | 73 | 58 | 15 |
| 7 | Cl₅PhOH, 2,4,6-Br₃PhOH. | 1/0.8/0.2 | 0.02 | 30 | 160 | 2.2 | 16.9 Cl, 5.7 Br | 64 | 58 | 15 |
| 8 | Cl₅PhOH | 1/1.95 | None | 35 | 160–168 | 1.16 | 32.0 Cl | 87 | 75 | 14 |
| 9 | 2,4-Br₂PhOH | 1/1 | 0.03 | 50 | 150–162 | 2.11 | 19.5 Br | 57 | 49 | 2 |
| 10 | 2,4,6-Br₃PhOH | 1/0.36 | 0.01 | 60 | 145–147 | 2.72 | 12.5 Br | 39 | 27 | 5 |
| 11 | Cl₅PhOH, 2,4,5,6-Cl₄PhOH, Bisphenol A. | 1/1.2/0.2 | 0.01 | 70 | 140–155 | 1.8 | 25.3 Cl | 86 | 130 | 12 |
| 12 | Cl₅PhOH, Cl₄PhOH, Bisphenol A. | 1/1.0/0.2 | 0.01 | 75 | 140–153 | 2.0 | 19.3 Cl, 6.8 Br | 84 | 120 | 12 |
| 13 | 2,4,6-Br₃PhOH, Bisphenol A. | 1/0.93/.075 | 0.02 | 50 | 150–162 | 2.3 | 25.0 Br | 51 | 32 | 6 |
| 14 | 2,4,6-Br₃PhOH, Bisphenol A. | 1/1.0/0.2 | 0.01 | 70 | 140–150 | 2.0 | 25.3 Br | 63 | 40 | 5 |
| 15 | 2,4,6-Br₃PhOH | 1/1 | 0.016 | 30 | 120–175 | 2.20 | 26.6 Br | 58 | 32 | 6 |
| 16 | 2,4,6-Br₃PhOH, Br₄PhOH, Bisphenol A. | 1/1.0/0.15 | 0.01 | 80 | 140–151 | 2.05 | 28.6 Br | 68 | 54 | 4 |
| 17 | Br₅PhOH | 1/0.35 | 0.04 | 45 | 145–158 | 2.90 | 19.5 Br | 52 | 50 | 17 |
| 18 | 2,4,6-Br₃PhOH | 1/1.52 ([7] 3.72 EN) | 0.02 | 40 | 145–167 | 2.09 | 30.2 Br | 70 | 58 | 14 |
| 19 | Cl₅PhOH | 1/1.52 ([7] 3.72 EN) | 0.02 | 40 | 140–165 | 1.91 | 25.0 Cl | 77 | 73 | 15 |
| 20 | Cl₅PhOH | 1/2.4 ([8] 4.6 EN) | None | 60 | 150–170 | 2.05 | 28.8 Cl | 97 | 170 | 10 |
| 21 | 2,4-Br₂PhOH | 1/1.60 | 0.016 | 60 | 155–165 | 1.60 | 26.4 Br | 64 | 50 | 2 |
| 22 | Cl₅PhOH | 1/1.6 | 0.01 | 85 | 150–160 | 1.65 | 28.9 Cl | 76 | 75 | 10 |
| 23 | 2,4-Br₂PhOH | 1/1.23 | 0.015 | 70 | 155–165 | 2.0 | 22.2 Br | 54 | 50 | 4 |

[1] 3.3 EN means an epoxy novolac resin having an average of 3.3 oxirane groups per molecule.
[2] TEA means triethylamine.
[3] Average oxirane groups were calculated by dividing the experimentally determined molecular weight by the experimentally determined epoxide equivalent weight.
[4] S.P. means Durran's softening point.
[5] Viscosity and color values according to the Gardner scales were obtained on 40 weight percent solutions of resin in butyl carbitol.
[6] The molar ratio represents the halophenols in the order named in the preceding column, where more than one was used.
[7] 3.72 EN means that an epoxy novolac resin having an average of 3.72 oxirane groups per molecule was used in this example.
[8] 4.6 EN means that an epoxy novolac resin having an average of 4.6 oxirane groups per molecule was used in this example.
[9] —Cl₃PhOH means trichloro phenol. —Br₂PhOH means —dibromo phenol. Etc.

The resins of the examples were further evaluated by admixing a curing agent therewith and making laminar structures thereof which were then tested according to standard tests. The laminating procedure followed will be described more fully hereinafter. The results thus obtained on the laminates are set out in Tables III, V, and VI, infra. (Table IV contains data on laminates made for comparative purposes.)

The above examples, illustrative of the practice of the invention, were prepared as follows:

An epoxy novolac resin, usually having an average of 3.2 oxirane groups per molecule, and an average molecular weight of about 570, was prepared by epoxylating novolac resin as above described. The thus epoxylated novolac was then reacted with a halogenated monohydric phenol, and an amine catalyst, usually triethylene amine, employing the reactants in the molar ratio and under the condition set out in Table I.

The percent bromine or chlorine, the molecular weight, softening point, viscosity, and color, determined as above described, were ascertained in each example and the values thereof are also set out in Table I.

Reference to Table I shows that when a halogenated phenol is reacted with an epoxy novolac resin, under the temperature and time conditions shown therein and in an amount of Lewis acid-amine complex or other type of hardening agent by one of the following procedures: casting into bars, employing as the laminant to prepare glass cloth laminar structures, or as surface coatings. In some compositions powdered antimony trioxide was admixed therewith as an auxiliary fire-retardant agent.

The castings were made as follows: the resins were warmed sufficiently to convert them to liquids which required a temperature of from about 20 to 30 centigrade degrees higher than the Durran's softening point shown in Table I. The percent by weight hardening agent set out hereinafter in Table II was then admixed therewith and the curable resin thus made poured into ½″ x ½″ x 6″ molds and cured under the conditions shown in the table. The bars were then tested according to standard procedures, e.g., heat distortion was run according to A.S.T.M. D 648–56 on a Tinius-Olsen testing machine; the hardness was measured according to the Barcol hardness scale as determined on a Barber-Coleman instrument; the Izod impact was determined according to A.S.T.M. D 256–56. Heat stability was determined as aforesaid, by ascertaining the weight loss after subjection to 200° C. temperatures for measured periods of time. The results of the tests are set out in Table II.

*Table II*

| Ex. No. | Test Bar From Resin in Example No. | Curing Agent | | Curing Schedule | | Heat Distortion in ° C. | Barcol Hardness | Percent Weight Loss After Specified Days at 200° C. | | |
|---|---|---|---|---|---|---|---|---|---|---|
| | | Type | Parts Per 100 Parts Resin | Time in Hours | Temp. in ° C. | | | 1 | 1 | 7 |
| 24 | 1 | BF$_3$:MEA [1] | 3 | 18 | 180 | 80 | 44 | 2.16 | 2.75 | 3.51 |
| 25 | 2 | BF$_3$:MEA [1] | 3 | 18 | 180 | 75 | 37 | 1.16 | 1.77 | 2.45 |
| 26 | 3 | BF$_3$:MEA [1] | 3 | 12 / 6 / 18 | 25 / 150 / 180 | 89 | 37 | 0.91 | 1.57 | 3.03 |
| 27 | 4 | BF$_3$:MEA [1] | 3 | 12 / 6 / 18 | 25 / 150 / 180 | 108 | 46 | 0.81 | 1.96 | 18.55 |
| 28 | 5 | BF$_3$:MEA [1] | 3 | 18 | 180 | 116 | 40 | 0.70 | 1.41 | 5.82 |
| 29 | 6 | BF$_3$:MEA [1] | 3 | 6 / 18 | 150 / 180 | 117 | 45 | 3.48 | 16.45 | 19.48 |
| 30 | 7 | BF$_3$:MEA [1] | 3 | 6 / 18 | 150 / 180 | 143 | 46 | 0.84 | 1.81 | 15.51 |
| 31 | 8 | MNA [2] / BDMA [3] | 13.8 / 1.2 | 16 / 18 | 50 / 180 | 89 | 38 | 1.97 | 5.44 | 15.76 |
| 32 | 9 | MNA / BDMA | 38.9 / 1.4 | 18 | 180 | 116 | 39 | 0.46 | 0.71 | 1.42 |
| 33 | 10 | BF$_3$:MEA | 2 | 12 / 18 | 25 / 180 | 162 | 45 | 0.39 | 1.02 | 4.20 |
| 34 | 80% Ex. 10 & 20% DEN 438 | BF$_3$:MEA | 3 | 2 / 18 | 150 / 180 | 161 | 43 | 0.22 | 0.34 | 0.43 |
| 35 | 80% Ex. 11 & 20% DER 661 | BF$_3$:MEA | 3 | 2 / 18 | 150 / 180 | 115 | 43 | 0.43 | 0.89 | 2.87 |
| 36 | 67% Ex. 12 & 33% DEN 438 | BF$_3$:MEA | 3 | 18 | 180 | 147 | 44 | 0.36 | 0.75 | 2.25 |
| 37 | 67% Ex. 12 & 33% DEN 438 | BF$_3$:MEA / Sb$_2$O$_3$ | 3 / 2 | 18 | 180 | 147 | 44 | 0.50 | 0.90 | 2.00 |
| 38 | 40% Ex. 13 & 60% DEN 438 | BF$_3$:MEA / Sb$_2$O$_3$ | 2 / 2 | 12 / 18 | 25 / 180 | 177 | 48 | 0.61 | 1.03 | 2.05 |
| 39 | 47% Ex. 14 & 53% DEN 438 | BF$_3$:MEA | 3 | 2 / 16 | 150 / 180 | 160 | 47 | 0.38 | 1.02 | 5.92 |
| 40 | 15 | BF$_3$:MEA | 3 | 6 / 18 | 150 / 180 | 107 | 47 | Not determined | | |
| 41 | 50% Ex. 16 & 50% DEN 438 | MDA / Sb$_2$O$_3$ | 18.5 / 2 | 12 / 18 | 25 / 180 | 149 | 45 | 0.48 | 3.90 | 8.85 |
| 42 | 17 | BF$_3$:MEA | 3 | 18 | 150 / 180 | 173 | 50 | 8.70 | 16.06 | 17.50 |
| 43 | 19 | BF$_3$:MEA | 3 | 6 / 18 | 150 / 180 | 103 | 42 | 0.93 | 1.88 | 7.09 |
| 44 | 70% Ex. 20 & 30% DEN 4.6 | BF$_3$:MEA | 3 | 2 / 16 | 150 / 180 | 154 | 47 | 0.22 | 0.37 | 0.52 |

[1] Boron trifluoride: monethylamine complex.
[2] Methyl nadic anhydride, a trade name for methyl cyclopentadiene-maleic acid adduct.
[3] Benzyl dimethylamine.

an amount sufficient to provide at least about 12 percent bromine (Examples 9 and 10), or at least about 18 percent chlorine (Examples 1 and 2), or a comparable percent of both bromine and chlorine (Examples 4 and 6) but in all instances in a molar ratio which insures that unreacted oxirane groups remain for subsequent cross-linking with a hardening agent, that a resin of satisfactory oxirane group functionality and softening point, and suitable viscosity and color when dissolved in an appropriate organic solvent is produced.

The halogenated resins produced in the examples shown in Table I were tested after admixing with a catalytic Some of the examples were repeated but contained in admixture, prior to cure, between about 0.5 and 5.0 percent by weight of Sb$_2$O$_3$. No noticeable effect on strength properties could be detected. However the heat stability of the resins containing Sb$_2$O$_3$ was greatly improved over otherwise comparable resins of the invention which contained no Sb$_2$O$_3$.

A number of examples were repeated employing an epoxy resin prepared by reacting epichlorohydrin with 4,4′-isopropylidene diphenol, known as bisphenol A, in the presence of aqueous NaOH, instead of the epoxy novolac resins. The cured reaction product of such epoxy resins and halogenated phenols showed such large decline in heat stability and heat distortion temperature, when compared to the corresponding product of the invention employing epoxy novolac resins, as to make them unsuitable for use in structural laminates.

Reference to Table II shows that castings made employing the resin of the invention possess good strength, hardness, heat distortion, and heat stability values.

Glass cloth laminates were then prepared, employing resins prepared according to a number of the examples of Table I, as representative of the composition of the invention, according to the following procedure:

181 Volan A fabric, a glass cloth which has been de-oiled and given a chromate finish to improve resin adhesion, having a thickness of about 0.0085 inch, an average weight of about 8.9 ounces per square yard, a 57 x 54 construction, and a breaking strength of 350 pounds per inch, was cut into 10-inch wide, 6-foot long strips. To portions of the resins of the selected examples there were admixed between 2 and 3 parts, per hundred parts of resin, of a curing agent, e.g., $BF_3$: monoethylamine complex. The resin was then dissolved in acetone to make between 55 and 60 percent total resin solid solutions. The glass cloth strips were then drawn through the acetone solution of the settable resin so made and the resin pick-up adjusted by means of a "doctor roll" arrangement by which procedure there was deposited thereon initially about 40 percent resin by weight of the resulting impregnated sheets. The impregnated strips were air dried overnight at room temperature to evaporate the solvent. They were then cut in 10 inch x 10 inch squares and given a short pre-cure for about 5 minutes in a 120° C. oven.

The partially cured squares were then stacked or laid up, according to the well known "nesting" procedure, to make a series of 12-ply laminates which were placed between platens of a hot press (with just enough pressure applied thereto to make good contact between the individual laminae, e.g., about 20 p.s.i.) and the laminates so made cured at a temperature of about 150° C. for periods of time varying between about 17 and 30 minutes. After this the laminates were removed from the press and given a post cure of 2 hours at 150° C. followed by 4 hours at 180° C., in an oven.

Laminates so made were tested. Flexural strength was determined according to Procedure B of A.S.T.M. Test D 790–58T. Modulus was calculated from the flexural test values according to standard procedure. The interlaminal shear was determined at room temperature according to the Aircraft Industries Association Research and Technical Committee Test No. ARTC VI. The self-extinguishing test was run according to the Boeing Test, BMS 8–5C, which is a modification of A.S.T.M. Test D 635–56T and is run as follows:

1 x 8 inch strips of four ply resin-impregnated glass cloth laminates of 0.030±0.004 inches in thickness are hung, with their longitudinal axis vertical, from pinpoint supports approximately one-half inch from the top. A Bunsen or Tirrill burner, with the air intake ports closed and adjusted to provide a yellow flame one and one-half (1½) inches high, is used to ignite the specimen. During the ignition period the burner is placed under the center of the bottom end of the specimen with the burner tip one inch below it so that one-third of the flame (one half inch long) impinges upon the specimen. The ignition period is thirty seconds after which the burner is removed.

The specimens are deemed self-extinguishing (S.E.) by this test if they meet the following requirements:

(a) The induced flame goes out within fifteen seconds after removal of the burner.

(b) Any afterglow or smoldering ceases to be visible within the next ten seconds.

(c) The burned section of the specimen does not exceed 3.0 inches in length, measured from the bottom end.

The results of the tests of the laminates are shown in Table III which follows:

*Table III*

| Ex. No. | Resin Used | | Curing Agent | | Percent Resin in Laminate | Halogen Content of Resin | HDT of Resin in °C. | Laminate Properties | | | | | |
|---|---|---|---|---|---|---|---|---|---|---|---|---|---|
| | Kind | Wt. percent | Kind | PHR[1] | | | | Test Temp. in °C. | Flexural Strength in p.s.i. | Modulus ×10⁶ | Interlam. Shear, p.s.i. | Fire Resistance | Sb₂O₃ Content |
| 45 | From Ex. 4 | 100 | BF₃:MEA | 2 | 43.3 | 12.0% Cl 8.7% Br | 109 | 25 127 | 95,700 | 1.63 | 3,450 | S.E.[2] | None. |
| 46 | From Ex. 7 | 100 | BF₃:MEA | 2 | 41.5 | 16.9% Cl 5.7% Br | 143 | 25 127 | 94,100 29,400 | 1.61 1.65 | 3,060 | S.E. | Do. |
| 47 | From Ex. 12 DEN 438[3] | 65 35 | BF₃:MEA | 3 | 39.3 | 12.5% Cl 4.4% Br | 143 | 25 150 | 69,300 53,200 | 3.12 2.34 | 2,830 | S.E. | 2%. |
| 48 | From Ex. 11 DEN 438 | 80 20 | BF₃:MEA | 3 | 38.4 | 20.3% Cl | 161 | 25 150 | 67,000 37,500 | 3.08 2.00 | 3,260 | S.E. | 2%. |
| 49 | From Ex. 11 Unox 207[4] | 80 20 | BF₃:MEA | 2 | 31.5 | 20.3% Cl | 116 | 25 150 | 87,900 16,500 | 3.92 2.07 | 3,500 | 2.E. | None. |
| 50 | From Ex. 20 EN 4.6[5] | 70 30 | BF₃:MEA | 3 | 38.8 | 20.3% Cl | 154 | 25 150 | 69,500 36,100 | 3.14 1.98 | 2,680 | S.E. | 2%. |
| 51 | From Ex. 20 DER 661[6] | 70 30 | BF₃:MEA | 3 | 37.8 | 20.3% Cl | | 25 150 | 71,400 10,500 | 3.28 0.88 | 3,870 | S.E. | 2%. |
| 52 | From Ex. 9 DEN 438 | 78.5 21.5 | MNA B₂DMA | 50.7 1 | 43.2 | 10.0% Br | | 25 127 | 79,300 45,000 | 2.80 1.79 | 3,930 | S.E. | None. |
| 53 | From Ex. 15 | 100 | BF₃:MEA | 2 | 38.0 | 26.6% Br | 107 | 25 127 | 97,000 24,800 | 1.81 1.88 | 3,100 | S.E. | Do. |
| 54 | From Ex. 13 DEN 438 | 40 60 | BF₃:MEA | 2 | 39.1 | 10.0% Br | 157 | 25 127 | 79,500 55,600 | 3.03 2.07 | 2,780 | S.E. | 2%. |
| 55 | From Ex. 14 DEN 438 | 47.5 52.5 | DiCY | 4 | 41.8 | 12% Br | | 25 150 | 78,800 54,500 | 3.01 2.11 | 3,430 | S.E. | None. |
| 56 | From Ex. 16 DEN 438 | 42 58 | BF₃:MEA | 3 | 35.8 | 12% Br | 173 | 25 150 | 84,900 65,800 | 3.20 2.75 | 2,830 | S.E. | Do. |
| 57 | From Ex. 16 DEN 438 | 42 58 | DiCY | 3 | 37.8 | 12% Br | | 25 150 | 85,600 52,500 | 3.23 2.51 | 3,400 | S.E. | Do. |
| 58 | From Ex. 16 EN 3.72[7] | 42 58 | DiCY | 3 | 34.6 | 12% Br | | 25 150 | 89,400 57,300 | 3.49 2.70 | 3,400 | S.E. | Do. |

[1] PHR—parts per hundred of resin.
[2] S.E.—self-extinguishing, according to standard test used.
[3] DEN 438—an epoxy novolac resin having an epoxide functionality of about 3.3.
[4] UNOX 207—dicyclopentadiene dioxide.
[5] EN 4.6—a epoxy novolac having an epoxide functionality of about 4.6.
[6] DER 661—a polyether of bisphenol A and epichlorohydrin having an epoxide equivalent weight of 475 to 575.
[7] EN 3.72—an epoxy novolac resin having an epoxide functionality of about 3.72.

Examination of Table III shows that laminates made by employing the resin of the invention, wherein an epoxy novolac is reacted with a halogenated phenol in an amount sufficient to provide at least about 10% bromine or at least 18 percent chlorine in the resin and to preserve an oxirane functionality of at least about 2 per molecule of the resin, a resin is produced which, upon admixture therewith of a curing agent and cured, has superior properties including self-extinguishing for use as a laminating resin.

A series of tests was run employing epoxy resins which are not those of the invention. These tests were run for comparative purposes and do not illustrate the invention. The resins and curing agents set out in Table IV, below, were admixed and the curable resin so made employed as the laminating resin in a procedure similar to that employed in the examples of Table III. The laminates so made were evaluated and the results obtained are also set out in Table IV.

*Table V*

| Ex. No. | Percent by Weight of Chlorine | Percent by Weight of $Sb_2O_3$ | Visible Flame in Seconds | Height of Charred Zone in Inches |
|---|---|---|---|---|
| 59 | 20 | 2 | 0 | 0.6 |
| 60 | 15 | 2 | 0 | 0.6 |
| 61 | 10 | 2 | 0 | 0.6 |
| 62 | 7 | 2 | Burned | |
| 63 | 15 | 5 | 0 | 0.7 |
| 64 | 10 | 5 | 0 | 1.1 |
| 65 | 7 | 5 | 9.8 | 1.7 |

| Ex. No. | Percent by Weight of Bromine | | | |
|---|---|---|---|---|
| 66 | 10 | 2 | 0 | 1.3 |
| 67 | 8 | 2 | 0 | 1.8 |
| 68 | 6 | 2 | 26 | 3.9 |
| 69 | 4 | 2 | Burned | |
| 70 | 8 | 5 | 0 | 1.3 |
| 71 | 6 | 5 | 2 | 1.2 |
| 72 | 4 | 5 | 16 | 3.5 |
| 73 | 3 | 5 | Burned | |

*Table IV*

| Comparative Run | Resin Used | Weight Percent of Resin | Curing Agent Kind | Curing Agent P.p.m. | Percent Resin by Weight of Laminate | Halogen Content | HDT °C. | Properties of Laminate Test Temp. °C. | Flexural Strength, p.s.i. | Modulus ×10⁶ | Interlaminar Shear | Fire Resistance | $Sb_2O_3$ Content |
|---|---|---|---|---|---|---|---|---|---|---|---|---|---|
| A | DER 661 [1] | 100 | $BF_3$:MEA | 3 | 34.4 | None | 117 | 25 / 150 | 70,500 / 19,300 | 3.09 / 1.16 | 4,030 | Burns | None. |
| B | DER 661 [1] | 100 | DiCY [3] | 4 | 39.4 | do | | 25 / 150 | 68,000 / 4,200 | 2.61 / 0.22 | 3,800 | do | Do. |
| C | EPON 1004 [2] | 100 | MNA [4] | 19.6 | 42.1 | do | | 25 / 127 | 82,200 / 9,300 | ------ / 0.06 | 4,000 | do | Do. |
| D | EPON 1004 [2] | 100 | MDA [5] | 5.5 | 35.8 | do | | 25 / 127 | 90,300 / 19,400 | ------ / 1.19 | 4,000 | do | Do. |
| E | DEN 438 | 100 | $BF_3$:MEA | 3 | 38.2 | do | 256 | 25 / 150 | 87,500 / 67,000 | 3.45 / 2.82 | 3,070 | do | Do. |

[1] DER 661—Trade name of The Dow Chemical Company for epoxy resin of Bisphenol A Type of molecular weight about 1000.
[2] EPON 1004—Trade name of Shell Chemical Company for epoxy resin of Bisphenol A Type of molecular weight about 1500.
[3] DiCY is an abbreviation for dicyandiamide.
[4] MNA is an abbreviation for methyl nadic anhydride, an adduct of methylated cyclopentadiene and maleic anhydride.
[5] MDA is an abbreviation for methylene dianiline.

Reference to Table IV shows that none of the resin-curing agent combinations there employed showed self-extinguishing properties.

As aforesaid, it has been shown that the presence of at least about 10 percent bromine and at least about 18 percent by weight of chlorine in the resin made is necessary to impart self-extinguishment thereto. However, the presence of a selected specified auxiliary fire-retardant agent, e.g., anitmony oxide, with either bromine or chlorine in accordance with the invention results in self-extinguishment when less than 10 percent bromine or 18 percent chlorine is present.

A series of tests was therefore run to show the effect of the presence of antimony oxide in the composition of the invention. The examples below were run by admixing the chlorine-containing resin made according to Example 20, supra, with epoxy novolac 438 in various weight proportions to give the percent chlorine in the final resin set out in Table V and admixing therewith the percent by weight of antimony oxide, by weight of the resin so made, set out in Table V. Laminates were made according to the above procedure except that they were 4-ply instead of 12-ply. The laminates so made were tested according to BMS 8-5C test for self-extinguishment. The results are shown in Table V.

Additional examples were also run to show the effect of the presence of antimony oxide in a bromide-containing resin of the invention by admixing the resin made according to Example 9, supra, with epoxy novolac resin in various weight proportions to give the percent bromide in the resin mixture shown in Table V. These laminates were also made as above and tested for self-extinguishment according to BMS 8-5C. The results are also shown in Table V.

By reference to Table V it can be seen that the preferred amount of antimony oxide to employ in the practice of the invention is between 2 and 5 percent and when that amount is present, no more than between about 7 percent bromine nor more than about 10 percent chlorine is required to be present to impart self-extinguishment to the resin of the invention.

To show the suitability of the resins of the invention for coatings, such resins were cured in a film form with triethylenetetramine (TETA) and tested for hardness and chemical resistance. The hardness test was run by dissolving the resin and an appropriate amount of TETA in diethylene glycol monobutyl ether to make a 50 percent solids solution, spreading the solution on a glass plate, evaporating the solvent and allowing the film to cure at room temperature for three days. The hardness was then determined on the cured resin films using the Sward hardness tester. The chemical resistance tests were run by depositing films of catalyzed resin solutions on microscope specimen slides, by dipping, curing the films for 16 hours at 50° C. temperature, and then immersing the cured resin films for 3 days at room temperature to the following corrosive materials: kerosene, acetone, and 10 percent by weight NaOH in water. The kerosene immersion had no effect on any of the films; the acetone showed a slight loss of adhesion of the films to the glass; the aqueous NaOH solution caused some marginal splitting along the edges of the glass slides, but otherwise the films remained clear and intact. Table VI below shows the results of the test. For comparative purposes, Example F employing a well known epoxy resin with an epoxide equivalent weight in the 465–550 range was run and is included in Table VI.

Table VI

| Example Number | Resin Used | Grams of TETA per 100 Grams of Resin | Sward Hardness | |
|---|---|---|---|---|
| | | | After 15 Hours at 50° C. | After 1 Hour at 100° C. |
| 74 | From Ex. 11 | 3.8 | 68 | 83 |
| 75 | From Ex. 16 | 4.6 | 65 | 79 |
| F | EPON 1001 | 5.4 | 56 | 74 |

Reference to Table VI shows that the resin of the invention possessed excellent hardness properties and showed some improvement in comparison to a well-known and widely used surface coating epoxy resin.

Having described my invention, what is claimed and desired to be protected by Letters Patent is:

1. An epoxy resin composition adapted to being converted, by admixture therewith, of a curing agent which effectuates a reaction among the oxirane groups thereof to produce a self-extinguishing heat-settable thermoset resin having flexible strength properties up to 95,000 pounds per square inch and inner laminar shear values up to 39,000 pounds per square inch consisting of the reaction product of an epoxy novolac resin and a halophenol selected from the class consisting of brominated and chlorinated monophenols in an amount of said monophenol which is sufficient to provide at least about 10 weight percent bromine when a brominated phenol is employed and at least about 18 weight percent chlorine when a chlorinated phenol is employed but which amount is insufficient to reduce the oxirane groups present substantially below an average of two oxirane groups per molecule.

2. The resin composition of claim 1 wherein said reaction product is formed by initiating the reaction between the epoxy novolac resin and halophenol by incorporating in the reaction mixture between about 10 and 1000 parts of a tertiary amine per million parts combined weight of the epoxy novolac resin and halophenol present.

3. The epoxy resin composition of claim 1 wherein the epoxy novolac resin employed contains an average of between 2.5 and 5.5 oxirane groups per molecule.

4. The epoxy resin composition of claim 1 wherein the halomonophenol is selected from the group consisting of dibromo-, tribromo-, tetrabromo-, pentabromo-, trichloro-, tetrachloro-, and pentachlorophenol, and mixtures thereof.

5. The epoxy resin composition of claim 1 which contains between 0.05 and 0.35 mole of a dihydroxyphenol per mole of the epoxy novolac present.

6. The epoxy resin composition of claim 5 wherein said dihydroxyphenol is selected from the group consisting of 4,4'-isopropylidenediphenol and halogenated 4,4'-isopropylidenediphenol.

7. The epoxy resin composition of claim 1 which contains as an auxiliary fire-retardant agent, an oxide of antimony.

8. The epoxy resin composition of claim 1 containing an amount of a non-halogenated epoxy resin in an amount sufficient to reduce the halogen content of said composition to about 10 percent when the halogen is bromine, to about 18 percent when the halogen is chlorine, and to a percent intermediate 10 and 18 percent when the halogen consists of both bromine and chlorine said intermediate amount being inversely proportional to the ratio of bromine to chlorine.

9. The epoxy resin composition of claim 8 wherein said non-halogenated epoxy resin is an epoxy novolac resin containing between 2.5 and 5.5 oxirane groups per molecule.

10. The self-extinguishing thermoset resin consisting of the composition of claim 1 and a hardening agent in an amount sufficient to effect cross-linking of substantially all oxirane groups present, said hardening agent being selected from the class consisting of primary and secondary aliphatic and aromatic amines in an amount sufficient to provide an average of between about 0.7 and about 1.2 amine hydrogens per oxirane group present, Lewis acids and Lewis acid amine complexes, methylcyclopentadiene-maleic acid adduct, and dicyandiamide in an amount sufficient to provide between about 1 and about 5 parts by weight of the Lewis acid, methylcyclopentadiene-maleic acid adduct, and dicyandiamide per 100 parts of resin.

11. The self-extinguishing thermoset resin of claim 10 wherein the Lewis acid is boron trifluoride: monoethylamine complex consisting of about 60 weight percent $BF_3$.

12. The self-extinguishing laminar structure consisting of glass cloth laminae bonded with the epoxy resin composition of claim 11.

13. A fluid composition having good spreading properties and adherence to solid surfaces when applied thereto as a coating and capable of curing to a thermoset hard protective film when thus applied consisting of the self-extinguishing thermoset resin of claim 11 dissolved in a volatile substantially inert organic vehicle.

14. The hard protective thermoset film deposited from the composition of claim 13.

References Cited by the Examiner

UNITED STATES PATENTS

| | | |
|---|---|---|
| 2,600,455 | 6/1952 | Wilson. |
| 2,908,664 | 10/1959 | Belanger _____ 260—47 |
| 2,909,501 | 10/1959 | Robitschek. |
| 2,931,739 | 4/1960 | Marzocchi _____ 117—126 |
| 2,967,843 | 1/1961 | Delmonte _____ 260—57 |
| 3,016,362 | 1/1962 | Wismer _____ 260—47 |

WILLIAM H. SHORT, *Primary Examiner.*

LOUISE P. QUAST, JOHN F. McNALLY,
*Assistant Examiners.*